July 28, 1964
W. REICH
3,142,074
BAG CONTENTS REMOVER
Filed Sept. 27, 1961
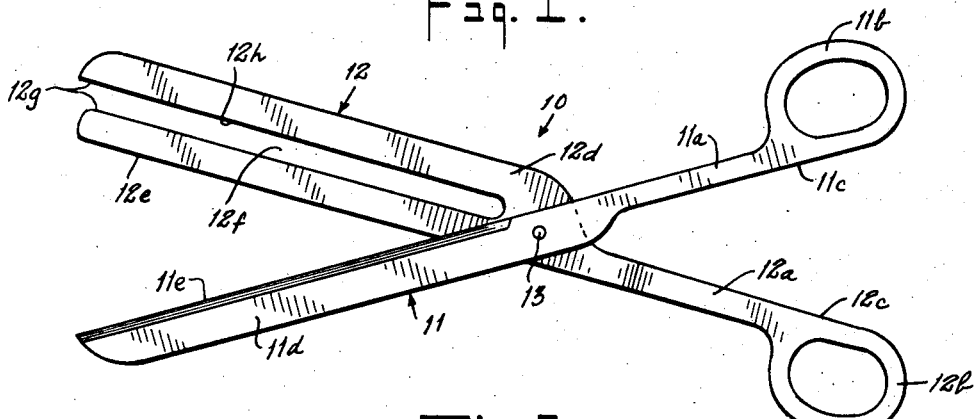
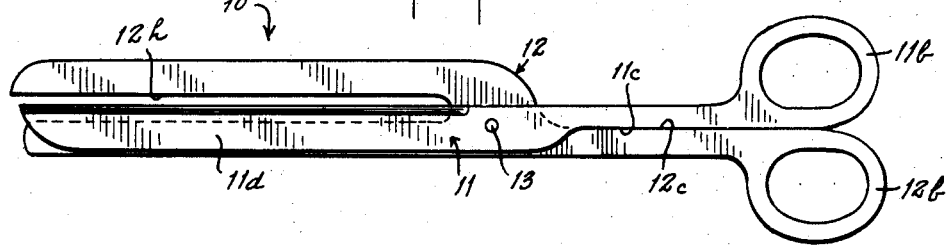
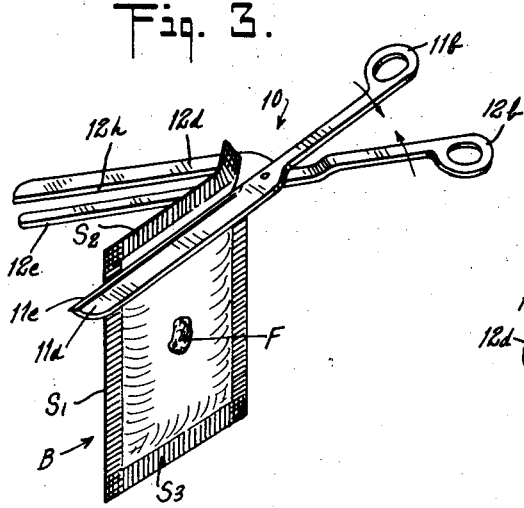
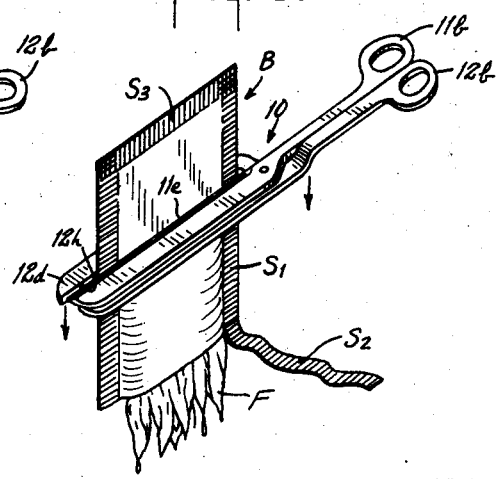
INVENTOR.
WERNER REICH
BY
Barnett + Barnett
ATTORNEYS United States Patent Office 3,142,074
Patented July 28, 1964

3,142,074
BAG CONTENTS REMOVER
Werner Reich, 666 W. 188th St., New York 40, N.Y.
Filed Sept. 27, 1961, Ser. No. 141,195
2 Claims. (Cl. 7—6)

This invention relates to a utensil and more particularly is directed to a combined shears and extruder serving as a bag contents remover for use in opening envelope or pillow type packages or bags of Pliofilm, polyethylene, waxed paper, metal foil or the like sheet material in popular use in packaging food products, such as, cake and pudding mixes, dehydrated foods of various types including soups, and a large variety of precooked frozen foods, and expelling, extruding or discharging the contents by progressively compressing the opposite walls of the package.

Among the objects of the invention is to provide a bag contents remover of the character described which shall be of simple construction, relatively easy to manufacture and assemble at low cost yet rugged to withstand rough usage, which shall provide means for cutting open the bag and then removing the contents by progressively compressing the opposite walls of the package, which shall be fool-proof in operation requiring a minimum of effort, time and skill on the part of the user, which shall be sanitary to use, which shall serve as a scissors for general use in the kitchen and elsewhere in the household in addition to its special function as a bag contents remover, and which shall be practical and efficient to a high degree in use.

Other objects of the invention will in part be obvious and in part hereinafter pointed out.

The invention accordingly consists of features of construction, combination of elements and arrangement of parts which will be exemplified in the construction hereinafter disclosed, the scope of the application of which will be indicated in the claims following.

In the accompanying drawing in which an illustrative embodiment of the invention is shown:

FIG. 1 is a plan view of the bag contents remover constructed to embody the invention with the jaws shown in open position.

FIG. 2 is a plan view of the bag contents remover shown in FIG. 1 with the jaws shown in closed position.

FIG. 3 is a perspective view showing the bag contents remover shearing open a food package.

FIG. 4 is a perspective view of the food package shown in FIG. 3 with the bag open and the bag contents remover being used to discharge the contents.

Referring in detail to the drawing, 10 generally denotes a bag contents remover or combined shears and discharger utensil constructed to embody the invention comprising a pair of jaw members 11 and 12 pivoted and held in face to face relation at a midportion thereof by rivet 13.

Bag contents remover 10, as seen in FIG. 1 may be provided with a handle or finger grip portion of any conventional construction well known in the art of scissors and shears, here shown as finger receiving rings 11b and 12b terminating handle portions 11a and 12a of jaw members 11 and 12, respectively, handle portions 11a and 12a being suitably offset from the normal plane of the opposite ends of jaw members 11 and 12 to engage each other along abutment portions 11c and 12c.

The opposite end of jaw member 11 may be formed as a cutting or shearing blade 11d of conventional construction having a cutting edge 11e coacting with an opposite cutting edge 12e of jaw member 12.

Jaw member 12 is fashioned with a blade 12d which may be wider than blade 11d to provide a longitudinal slot 12f preferably open at free end 12g. Slot 12f is sized and located with respect to pivot pin 13 and cutting edge 11e of jaw member 11 to provide a narrow slit between cutting edge 11e and opposite edge 12h of slot 12f when the jaw members are in closed position shown in FIG. 2 with abutment portions 11c and 12c in contact with each other.

After jaw members 11 and 12 are manufactured from metal or other suitable material as hereinbefore described and shown in the drawing and pivotally mounted in face to face relation by rivet 13 or any other suitable means such as a bolt and nut (not shown), the practical operation and utility of bag contents remover 10 in the modern kitchen will be apparent.

Package B, shown in FIGS. 3 and 4, represents a bag or envelope of suitable sheet material having heat sealed side, top and bottom seams or margins $S_1$, $S_2$ and $S_3$, respectively, containing a prepared and precooked frozen food product F, as for example, creamed spinach, after having been heated in boiling water in accordance with conventional instructions on the package and ready for removal of the contents F. Holding package B in one hand along side seam $S_1$, or at the corner of side and top seams $S_1$, and $S_2$ and gripping bag contents remover 10 with the other hand in the manner of holding any conventional pair of scissors, the bag is cut open just inwardly of top seam $S_2$ as shown in FIG. 3. Package B may then be inverted to dispense contents F into a suitable receptacle (not shown). Total removal of contents F from the bag may now be readily accomplished with the use of remover 10. By first holding the inverted bag in one hand along closed seam $S_3$ and remover 10 in the other hand in partly open position, inserting the region of the bag adjacent seam $S_3$ into slot 12f of blade 12d, bringing jaw members 11 and 12 together to fully closed position with abutment portions 11c and 12c in contact as seen in FIGS. 2 and 4 so that edge 12h of slot 12f and edge 11e of blade 11d bear against and compress opposite walls of the bag and then drawing remover 10 downwardly in the direction of the arrows in FIG. 4 across the entire length of the bag, contents F is completely discharged through the opening and into the receptacle beneath.

It is thus seen that there is provided a bag contents remover in which the several objects of the invention are achieved and which are well adapted to meet conditions of practical use.

As various possible embodiments might be made in the above invention, and as various changes might be made in the construction above set forth, it is to be understood that all the matters herein set forth or shown in the accompanying drawings are to be interpreted as illustrative and not in a limiting sense.

Having thus described my invention, I claim as new and desire to secure by Letters Patent:

1. A bag contents remover of the character described comprising a pair of jaw members, means pivotally interconnecting said jaw members in face to face scissor-like relation at a midportion thereof, each jaw member having finger grip means on one end and a blade formed along the opposite end thereof, each blade having an exterior cutting edge opposing the other, a first of said blades being formed with a longitudinal slot extending substantially the length thereof, means associated with at least one of said jaw members for abutting the other jaw member to position said blades in an aligned parallel fully closed overlying relation, said longitudinal slot being positioned with respect to the second of said blades and said pivotal interconnecting means for partial restriction by said cutting edge of the second of said blades when the blades are in said fully closed position for contacting and compressing opposite side walls of a sheet material bag positioned in said slot to dispense contents thereof by drawing the remover across the length thereof from a closed bag end to an opposite open end.

2. The bag contents remover defined in claim 1 in which said slot is open at a free end of said first blade.

References Cited in the file of this patent

UNITED STATES PATENTS

| | | |
|---|---|---|
| 903,087 | Helderman | Nov. 3, 1908 |
| 2,434,550 | Dainiel | Jan. 13, 1948 |

FOREIGN PATENTS

| | | |
|---|---|---|
| 272,728 | Switzerland | Apr. 2, 1951 |